Jan. 13, 1931.  J. H. PETERSON  1,788,690
HYDRAULIC BRAKE FOR VEHICLES
Filed June 28, 1930   2 Sheets-Sheet 1

Inventor
J. H. Peterson
By Arthur Sturges
Attorney

Jan. 13, 1931.  J. H. PETERSON  1,788,690
HYDRAULIC BRAKE FOR VEHICLES
Filed June 28, 1930  2 Sheets-Sheet 2
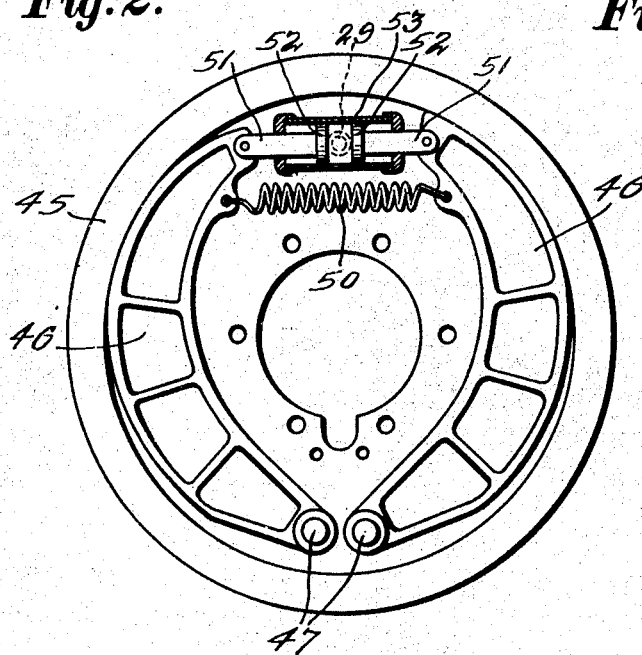
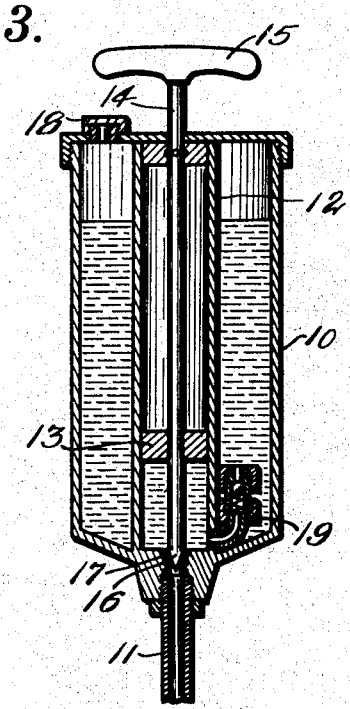
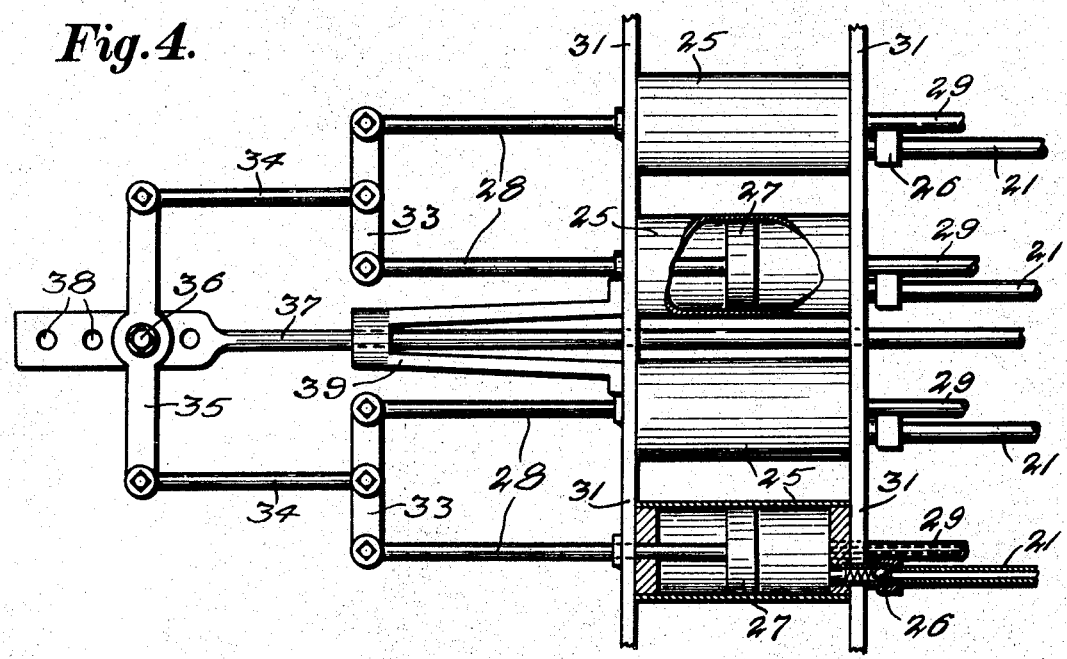
Inventor
J. H. Peterson
By Arthur H. Sturges
Attorney Patented Jan. 13, 1931

1,788,690

UNITED STATES PATENT OFFICE

JOHN H. PETERSON, OF SILVER CITY, IOWA

HYDRAULIC BRAKE FOR VEHICLES

Application filed June 28, 1930. Serial No. 464,617.

The present invention relates to brakes, and more particularly to brakes applicable to vehicles, such as automobiles.

An object of the present invention is to provide an improved brake mechanism of the hydraulic type which may be easily and quickly installed upon automobiles, which will insure an even distribution of the fluid medium employed, which will exert an equalized yet independent pressure at each of the braking units, and an improved brake of the hydraulic type wherein upon damage to any one of the units the same may be disconnected from the general system and the latter operated without loss of fluid.

Another object of the present invention is to provide a brake mechanism which includes equalization not only through the fluid medium but also through mechanical equalizers which are incorporated in the structure so as to maintain desired pressure in each of the several independent fluid lines and which will equalize the pressure distributed to the several lines.

The invention also aims at the provision of a brake mechanism of this character wherein the braking effort may be simultaneously and equally applied practically instantaneously upon the movement of a foot pedal or the like to thus insure a brake mechanism which is under complete control of the operator.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a brake mechanism constructed according to the present invention, the dotted lines showing the relative location of the brake mechanism upon an automobile.

Figure 2 is an enlarged detail inner side elevation of the brake drum of a wheel showing the brake mechanism applied thereto.

Figure 3 is a vertical section taken through a supply cylinder for the fluid of the mechanism.

Figure 4 is an enlarged fragmentary plan view of the independent units with the coupling and actuating means therefor, parts being shown in section.

Figure 1:
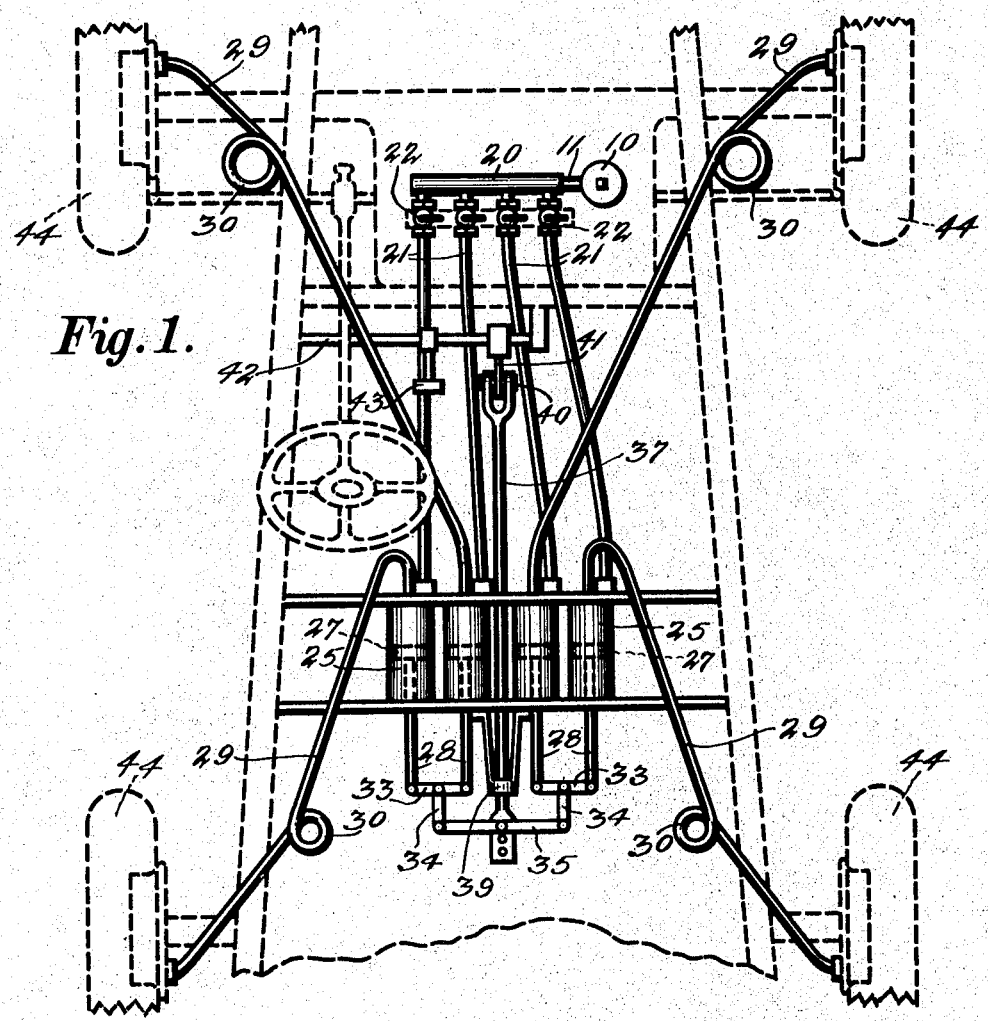

Referring now to the drawings, 10 designates a supply cylinder or reservoir which may be of any suitable size, and which as shown in Figure 3 may comprise a cylindrical container having a depressed bottom and into the lower intermediate portion of which is threaded a supply pipe 11. Concentrically disposed within the container 10 is a pump cylinder 12 having a piston 13 therein mounted on a rod 14 having a handle 15 on its upper end. The lower end of the rod 12 is pointed or tapered to provide a needle valve 16 adapted to seat in a flaring bushing 17 disposed in the bottom of the container 10 for shutting off the flow of liquid, such as oil, from the container 10 into the supply pipe 11.

The top of the container 10 is provided with a removable cap 18 by means of which the container may be supplied with liquid from time to time. The pump cylinder 12 has near its lower end an inlet nozzle 19 provided with an upwardly seating valve as shown in Figure 3 for admitting the flow of oil from the container 10 into the lower end of the pump cylinder 12 when the piston 13 is raised.

Figure 5:
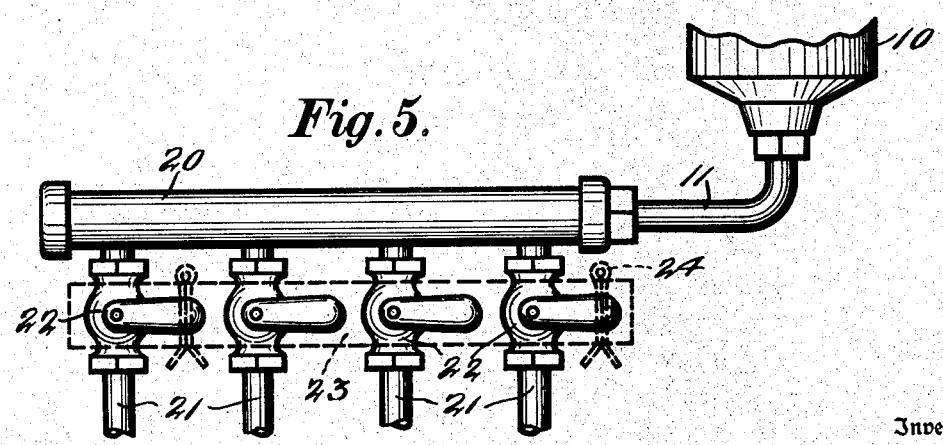
Figure 5 is a fragmentary enlarged plan view of the distributor header with the independent control means for the branches of the system.
Figure 6:
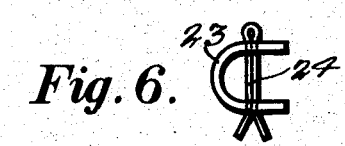
Figure 6 is a detail end view of the guard device employed for the branch control valves.

The supply pipe 11 leads to a header 20 which may be in the form of a cylinder or the like with the pipe 11 opening into one end thereof and the header being closed at its opposite end as shown in Figure 5.

From the header 20 extends a number of branch pipes 21. Four such pipes are shown in the present instance, and each pipe is provided with a valve or turning plug 22, the handle of which is disposed at one side of the valve, and the valves and their handles are so arranged as to register longitudinally when all of the valves are open. Each pipe 21 is provided with a valve 22 so that the flow of oil from the container 10 may be selectively cut off to each pipe independently of the other pipes. In order to maintain the valve handles in closed position and from accidently opening incident to the vibration of the vehicle or the like, a guard strip 23 is employed, the same being U-shaped in cross section and of sufficient depth to fit over the handles of the valves 22 and enclose the same. The guard plate 23 is provided at opposite sides and at suitable spaced points with apertures through which cotter pins 24 or the like may be passed for holding the guard plate in position.

Each pipe 21 extends horizontally from the header 20 to an independent pressure unit in the form of a cylinder 25. In the present instance the brake mechanism is applicable to the four wheels of a motor vehicle and each wheel element of the brake is provided with a cylinder or pressure element 25. The pipe 21 enters the rear end of the pressure cylinder 25 to deliver oil thereto, and the pipe has interposed in it, and preferably adjacent the end of the cylinder, an inwardly opening check valve 26 which may be of the ball type, as shown to advantage in Figure 4, for permitting the passage of oil into the cylinder 25 and preventing the return of the oil to the pipe 21.

The cylinder 25 is provided with a piston 27 mounted on the end of a piston rod 28 which extends axially through the opposite end of the cylinder 25. The said first end of the cylinder 25 is provided with a distributing branch pipe 29 which leads to one of the brake units of the vehicle, and the pipe 29 is preferably provided at one or more intermediate points with loops or helices 30 arranged at the desired angle to permit of the free flexing of the pipe 29 without damage thereto incident to the vibration of the adjacent wheel and axle of the vehicle.

As may best be seen from Figure 4, the four cylinders 25 are mounted in a frame comprising cross pieces 31 which have their ends secured to the side frames 32 of the vehicle, as shown in dotted lines in Figure 1, for rigidly supporting the cylinders 25 in a horizontal transverse row, and for supporting the equalizing and operating devices of the mechanism. The four piston rods 28 project from the ends of their respective cylinders and are coupled together in pairs by cross pieces 33 which are pivotally mounted on the outer ends of the pairs of rods 28.

Each cross piece 33 is pivotally connected intermediate its ends to one end of a link 34, and the two links 34 are pivotally connected at their outer ends to a cross piece 35 which at its intermediate portion is pivotally mounted upon a pivot pin 36 adjustably connected in the end of a pull rod 37. The pull rod 37 is flattened at its rear end and provided with a longitudinal row of apertures 38 adapted to selectively receive the pivot pin 36 therein so as to vary the relative positions of the rod 37 and the various piston rods 28. The rod 37 is slidably mounted in a bracket 39 carried upon the adjacent side of the frame 31, and the rod 37 passes through the frame between the inner cylinders 25 and forwardly thereof where the rod 37 is pivotally connected by a pin 40 to an arm 41 carried on a cross shaft 42 suitably mounted in the frame 32 of the vehicle. The shaft 42 is provided with a foot pedal 43 by means of which the shaft 42 may be rocked so as to draw the rod 37 forwardly.

Referring now to Figure 2, each element of the brake, located one at each wheel 44 of the vehicle, comprises a brake drum 45 provided with a pair of internal brake shoes 46 pivotally mounted at their lower ends on pins 47 to the stationary plate within the drum, and which at their upper ends are normally urged to contract away from the drum 45, by a spring 50.

The free end of each brake shoe 46 carries a piston rod 51 having a piston 52 on its outer end slidable in a cylinder 53 suitably mounted upon the said plate within the drum. The piston rods 51 are of such length that the pistons 52 are spaced apart in the cylinder 53 and the branch supply pipe 29 opens into the cylinder 53 at a point between the pistons 52, as shown in dotted lines in Figure 2.

In operation, the oil is placed in the cylinder 10 and by means of operating the piston 13 is forced through the supply pipe 11 into the header 20. From the header 20 the oil passes through the branch pipes 21 into the cylinders or pressure elements 25 of the mechanism. The oil is forced into the system so as to maintain the piston 27 at an intermediate point in the cylinders 25 as shown in dotted lines in Figure 1 and in full lines in Figure 4. The oil is also supplied to the branch supply pipes 29 and to the spaces in the cylinders 53 between the pistons 52.

When the valves 22 are adjusted, the guard strip 23 is applied thereto and the valves are thus securely held from accidently moving out of position.

When it is desired to apply the brakes, the operator moves the pedal 43, turns the shaft 42 and swings the arm 41 to draw the rod 37 forwardly. As the rod 37 moves forwardly it carries with it the large cross bar 35 and through the links 34 advance the smaller cross bars 33 forwardly so as to move the piston rods 28 forwardly in the cylinders 25. Thus, there is an equalization not only between the pairs of piston rods 28, but also between the piston rods of each pair so that there is an equalization of pressure on all of the pistons 27 in the various cylinders 25.

The result is that should there be an unequal amount of fluid in any of the pipes 21 and 29 of the system, the loss will be compensated for by the pivotal and pressure transfer action of the various links and cross bars 33, 34 and 35.

When one of the cylinders 25 is empty the piston 27 thereof will move freely therein in advance of the other piston of a pair due to the fact that the piston 27 normally rests at an intermediate point in the cylinder so that the distance of travel of the piston 27 to the end of the cylinder is very small. Moreover, the piston rods 28 are sufficiently long and flexible enough to permit the rods 28 to approach one another when the cross bars 33 are swung about their pivots. There is also a certain amount of looseness between the parts 28, 33 and 34 to compensate for any movement of the rods 28 towards each other so that there will be no binding between the piston rods 28 and their bearings in the cylinders and the pistons will not jam in the cylinder.

The liquid under pressure enters the cylinders 53 and spreads the pistons 52 apart with the result that the brake shoes 46 are moved into engagement with the inner surface of the drum 45 and exert pressure thereagainst to effect the braking action.

If it is desired the locking device may be applied to the valve handles as shown in Figure 5, and wherein the locking strip 23 engages over the axially aligned handles for holding the valves 22 in closed position. When it is desired to admit more liquid to one or more of the pipes 21, it is only necessary to open the respective valves 22 and operate the pump piston 13 to supply the desired branch or branches with the oil.

It is obvious that various changes and modifications may be made in the details of construction and design of the above specially described embodiment of this invention without departing from the spirit thereof, such changes and modifications being restricted only by the scope of the following claims.

What is claimed is:—

1. In a braking system, a series of pressure elements, conduits connected independently to said pressure elements, each of said pressure elements comprising a cylinder, a frame for carrying said cylinders, a piston mounted in each cylinder and having a relatively short rigid piston rod projecting therefrom, relatively short cross bars pivotally connected to said piston rods for coupling the same in pairs, a link pivotally carried by each cross bar, a large cross bar pivotally mounted on the outer ends of said links, and a pull rod rigidly guided in said frame and adjustably and pivotally connected to said larger cross bar for advancing all of the cross bars and links in one direction for exerting uniform and equal pressure upon fluid contained in said cylinders.

2. In a braking system, a plurality of pressure elements, conduits connected independently to the pressure elements, each of said pressure elements comprising a cylinder, a frame for carrying said cylinders, a liquid supply header, independent connections between said header and said pressure elements, valves in said connections for independently cutting off the pressure elements from said header, a piston mounted in each cylinder and having a piston rod projecting therefrom, cross bars pivotally connected to said piston rods for coupling the same in pairs, a link pivotally carried by each bar, a larger cross bar pivotally mounted on the outer ends of said links, and a pull rod guided in said frame and pivotally connected to said larger cross bar for advancing all of the cross bars and links in one direction for exerting uniform and equal pressure upon fluid contained in said cylinders.

In testimony whereof, I have affixed my signature.

JOHN H. PETERSON.